No. 779,754.

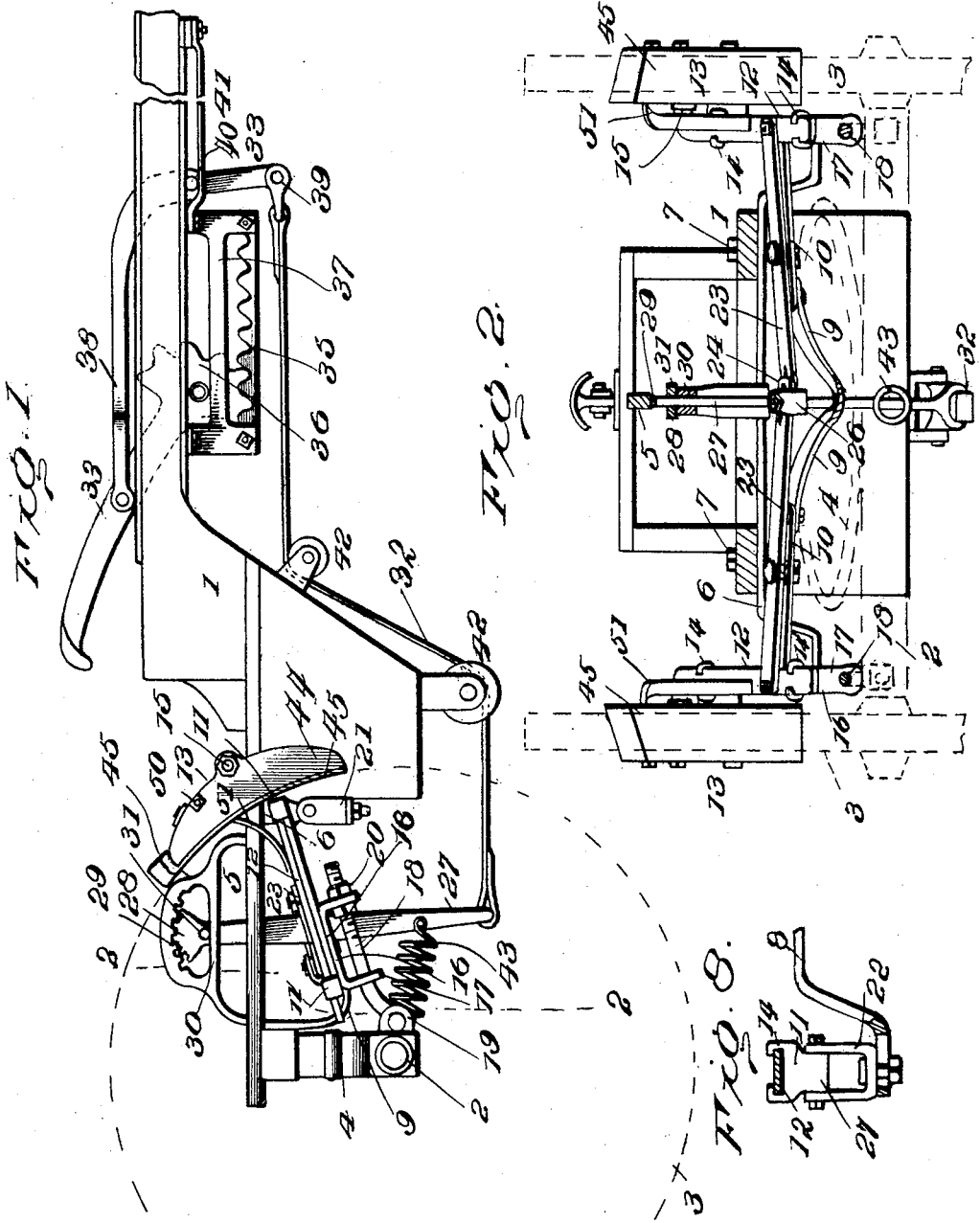

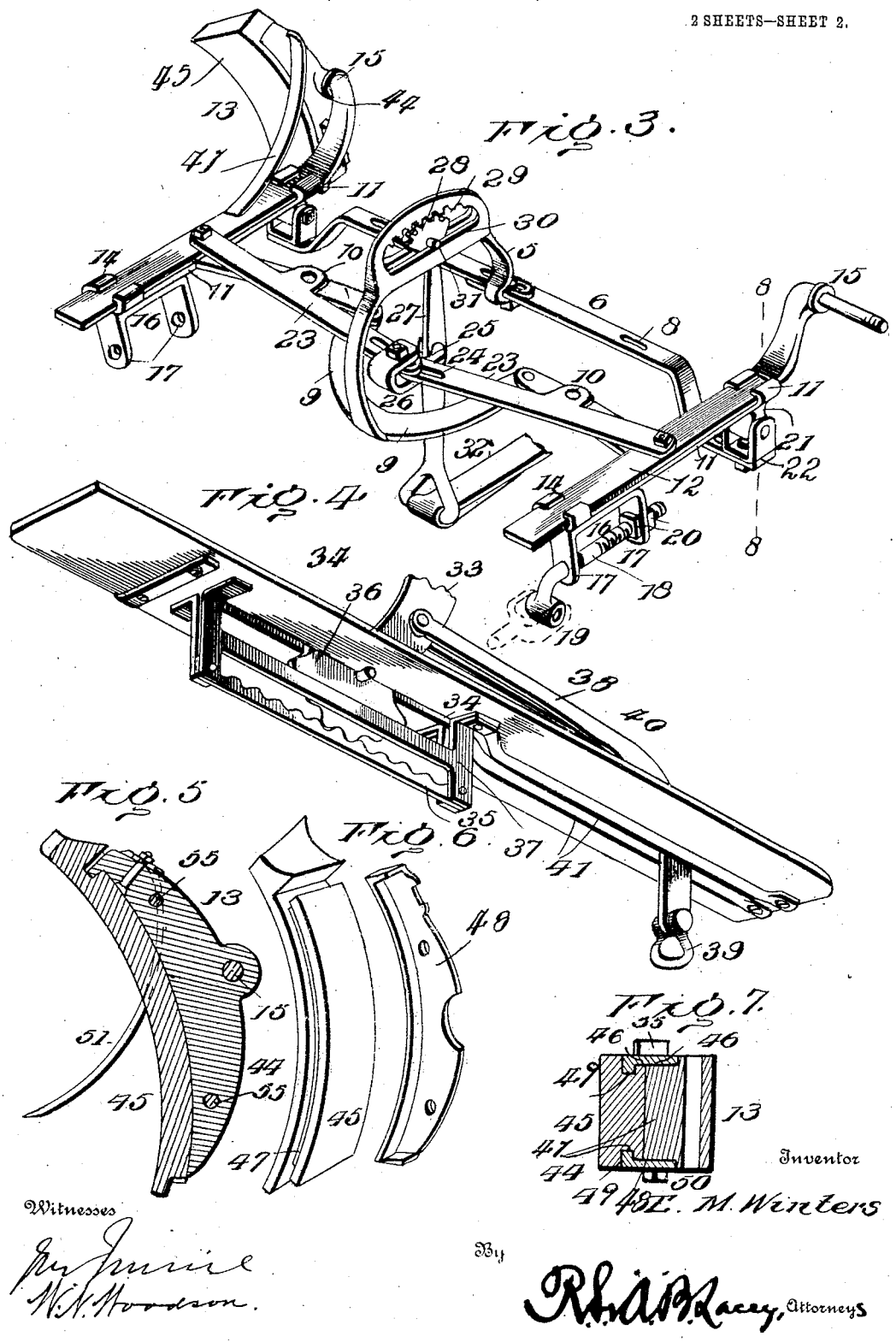

Patented January 10, 1905.

UNITED STATES PATENT OFFICE.

EMANUEL M. WINTERS, OF SQUARETOP, PENNSYLVANIA.

VEHICLE-BRAKE.

SPECIFICATION forming part of Letters Patent No. 779,754, dated January 10, 1905.

Application filed March 28, 1904. Serial No. 200,392.

*To all whom it may concern:*

Be it known that I, EMANUEL M. WINTERS, a citizen of the United States, residing at Squaretop, in the county of Wyoming and State of Pennsylvania, have invented certain new and useful Improvements in Vehicle-Brakes, of which the following is a specification.

The improvements in vehicle-brakes which form the basis of my invention relate particularly to the manner of mounting the operating mechanisms, whereby upon application thereof the strain of the braking action will not force the wheels rearward and affect the rigidity of the mounting of the axle carrying same relative to the vehicle-body.

It is well known that in vehicles in which the vehicle-body is supported upon the axles by means of elliptical springs the pressure of the brake-shoes against the wheels tends to loosen the bearing connections of the spring with the axle upon which said wheels are mounted, and thus the axle gets a certain amount of play as regards the shoes, very detrimental to the proper working of the brakes. Thus when the vehicle is ascending grade the axle plays forwardly against the brake-shoes, retarding movement to some extent, and when going downgrade the play of the axle is such as to cause the wheels to move away from the brake-shoes to such an extent that in some instances it is impossible to apply the brakes.

My invention aims to obviate the foregoing disadvantages of construction and also to provide novel operating means whereby comparatively small amount of power is necessary to effect a very efficient braking action.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a side elevation. Fig. 2 is a section on the line 2 2 of Fig. 1. Fig. 3 is a detached perspective view of the brake mechanism. Fig. 4 is an under side perspective view of the main operating-lever and adjacent mechanism. Fig. 5 is a vertical section of the brake-shoe. Fig. 6 is a detail perspective view, parts separated, of the brake-shoe. Fig. 7 is a horizontal section of the brake-shoe. Fig. 8 is a detail view showing more clearly the mounting of the guide members upon the supporting-arms.

Corresponding and like parts are referred to in the following description and indicated in all the views of the drawings by the same reference characters.

Though my brake structure is especially adapted for use upon cabs or like vehicles, it will be understood that it may be advantageously applied to any type of wagons or vehicles now in common use. The invention is shown in its adaptation as a manually-operated brake, though any suitable power may be utilized to apply the brakes in connection with the operating means hereinafter to be described.

In the drawings, 1 indicates a wagon-body partially broken away, which latter is mounted upon a rear axle 2, provided with the ground-wheels 3. The wagon-body is supported upon the axle 2 by means of a spring 4 of the usual elliptical type commonly seen upon vehicles. Secured to the rear portion of the body 1 of the vehicle is disposed a curved supporting-bar 5, the front end of which is carried by laterally-adjustable supporting members 6, secured directly to the wagon-body. The supporting members 6 are disposed transversely of the wagon-body 1, being secured thereto by means of fastening-bolts 7 or the like. The fastenings 7 pass through longitudinal slots 8 in the supporting members 6, so as to admit of a lateral sliding adjustment of said members for purposes which will be set forth hereinafter. The inner ends of the members 6 are likewise slotted, and the fastening member which secures the inner ends together constitutes the means for securing the curved supporting-bar 5 upon the wagon-body. The supporting-bar 5 has its rear portion extended downwardly and formed with bifurcated extensions 9, projected downwardly therefrom. The extensions 9 have pivoted to the end portions thereof the supporting-arms 10, the inner ends of the supporting-arms being suitably secured by a pivotal fastening to the end portions of the extensions 9. The supporting-arms 10 are of approximately T form, being provided at their outer ends with integral guide members 11. Brake-bars 12 are slidably mounted upon the guide members 11 of the supporting-arms 10, and these bars directly support the brake-shoes 13. Guide projections 14 extend upwardly from the guide members 11 and direct the movement of the brake-bars 12, which latter are longitudinally slidable relative to the vehicle-body. A slidable movement of the brake-bars effects the movement of the brake-shoes toward and from the wheels 3, and the said shoes are mounted upon angular extensions 15 of the said brake-bars.

Projecting downwardly from the rear end portion of each guide member 11 is a bracket 16, which is of approximately U form in elevation, and the arms 17 of the brackets are provided with openings through which an adjusting-bar 18 passes. Each adjusting-bar 18 is longitudinally threaded and is carried by the axle, being pivoted to a pivot member 19, secured to the said axle. Nuts 20 are adjustably disposed upon the adjusting-bar 18 and are adapted to coöperate with one of the arms 17 of the adjacent bracket 16 to fix the adjustment of the supporting-arm which carries the brake-bar adjacent thereto. From the foregoing it will be noted that the supporting-arms, which are pivotally mounted upon the bifurcated extensions of the bar 5, are adapted for adjustment by means of the adjusting-bars 18, so as to regulate the amount of movement imparted to the brake-shoes 13.

Depending from the front end of each of the guide members 11 of the supporting-bars 10 is a lug 21, secured to the adjacent end of the supporting member 6 by means of a swivel member 22. The supporting members 6 being rigidly secured to the body of the vehicle and the adjusting-bars 18 being likewise permanently, though pivotally, mounted upon the axle 2, it will therefore be noted that the guide members 11, together with the members 18 and 6, constitute rigid connecting means between the vehicle-body and the axle. Adjustment of the nuts 20 upon the bar 18 will cause a pivotal movement of the adjacent supporting-arm 10 to a certain extent, and a slight pivotal movement of this supporting-arm is likewise caused when the adjacent supporting member 6 is laterally adjusted so as to move the brake-shoe laterally.

The brake-bars 12 are actuated by means of horizontal levers 23, which are pivoted at points between their ends to respective supporting-arms 10, their outer ends being connected with the said brake-bars. The inner ends of the actuating-levers 23 are provided with longitudinal slots 24, and a connecting-bar 25 is secured to the slotted end portions of the levers 23 by means of a pivotal fastening 26. The connecting-bar 25 connects the inner ends of the levers 23 with a compensating lever 27, which latter is mounted in a relative vertical position upon the curved supporting-bar 5. The upper end of the compensating lever 27 is provided with a toothed segment 28, which latter meshes with teeth 29, formed upon the bar 5. The upper end of the lever 27 is received between spaced guide-bars 30 of the supporting-bar 5, and a transverse-pin 31 prevents displacement of the segment 28 from engagement with the toothed portion of the bar 5. The compensating lever 27 is virtually pendent from guide-bars 30, and the lower end of said lever is connected, by means of a flexible connection 32, to the main power or operating lever 33. The power-lever 33 is mounted upon the forward portion of the vehicle-body in a position convenient for operation either by foot or hand of the driver of the vehicle. The mounting of the power-lever is peculiar in that same is such as to give a maximum degree of braking connection with a comparatively small movement of the said lever. The lever 33 is slidable upon the vehicle-body, passing through a slot 34. The lever 33 is supported by a rack-bar 35, and the lower end of this lever is also provided with an integral toothed segment 36. The rack-bar 35 is secured to the lower ends of spaced plates 37, which latter receive the segment 36 of the power-lever 33 therebetween. The plates 37 are secured to the under side of the vehicle-body in the spaced relation aforementioned and form guides coöperating with the segment 36 to direct and properly position the lever 33 in its slidable movement. A pivoted bar 38 is secured at one end to the lever 33, and the other end of this bar passes through the slot 34, being provided with a swiveled link 39, to which the flexible connection 32 is directly connected. The pivoted bar 38 has a relatively horizontal movement as regards the vehicle-body, and a transverse pin 40, passing through the depending end of this bar, moves in longitudinal guides 41, carried by the vehicle-body and suitably secured to the latter adjacent the spaced plates 37. The connection 32, which is secured at one end to the link 39, passes about pulleys 42 as it extends to the point of connection with the compensating lever 27. The disposition of the connection 32 will of course be varied dependent upon the class of vehicles to which the brake mechanism is applied. Because of the mounting of the power-lever 33, the same not only gets a pivotal movement, but a slidable adjustment adapted to greatly increase the length of its pivotal movement, and thus the relative power of this member is greatly increased in quickly applying the brakes.

The brake-bars 12 are normally held in positions upon the supporting-arms 10 so that the brake-shoes are spaced from the wheels with which they engage. The means for holding the shoes in the position indicated above comprises a spring 43, which connects the lower portion of the compensating lever 27 and the axle 2. The spring 43 normally exerts a tension sufficient to hold the shoes 13 away from the wheels, the actuating-levers 23 being acted upon by the spring 43 to accomplish the above through the medium of the compensating lever 27 above mentioned. The brake-shoes embody a specific structure comprising the blocks 44 and removable rubbers or friction-plates 45. The brake-blocks are provided with openings which receive the angular extensions 15 of the brake-bars 12, and these blocks are provided upon their inner sides with flanged plates 46. The rubber or friction-plate 45, which is to be secured to the brake-block, is provided upon its sides with longitudinal grooves 47, and one of the grooves of each rubber receives the flange 49 of the plate 46 of the adjacent block 44. A clamp-plate 48, flanged, as shown at 49, is secured upon the outer side of each block 44 by means of nuts 50, adapted to be screwed upon the end of an adjacent bolt or bolts 55. The flange of each clamp-plate engages in one of the grooves of the adjacent rubber 45, and the latter is thus securely held between the flanges 49. Removal of the clamp-plate admits of ready displacement of the rubber should same be worn or unserviceable. A spring 51 is carried by each block 44 and engages the brake-bar which carries said block.

The brake parts are adapted for application to different-sized vehicles because of the adjustability particularly of the supporting members 6 and the supporting-arms 10. The actuating-levers 23 admit of this adjustment because of their construction, and the adjusting-bars 18 are important members in their coöperation to fix the supporting-arms at an ascertained adjustment. The adjusting members also hold the axle rigid as regards the wagonbody and prevent any sagging or play of the axle. The various parts may be quickly removed or secured in position by persons having ordinary mechanical skill.

Having thus described the invention, what is claimed as new is—

1. In a vehicle-brake, the combination of a wagon-body, a supporting-axle, supporting members carried by said wagon-body, connecting means between the said supporting members and the axle, brake-bars mounted upon the connecting means aforesaid, and means for actuating said brake-bars.

2. In a vehicle-brake, the combination of a wagon-body, a supporting-axle, supporting members projected from the wagon-body, supporting-arms, connecting means between the supporting members and the supporting-arms, and other connecting means between the supporting-arms and the axle, brake-bars mounted upon the supporting-arms aforesaid, and means for actuating said brake-bars.

3. In a vehicle-brake, the combination of a wagon-body, laterally-adjustable supporting members carried thereby, supporting-arms adjacent the supporting members aforesaid, brake-bars slidably mounted upon the supporting-arms, and means for actuating said brake-bars.

4. In a vehicle-brake, the combination of a wagon-body, a supporting-axle, supporting members projected from the wagon-body, movable supporting-arms mounted upon said wagon-body, brake-bars carried by said supporting-arms and provided with brake-shoes, means for actuating the brake-bars, and an adjusting-bar connecting each supporting-arm with the adjacent axle.

5. In a vehicle-brake, the combination of a wagon-body, laterally-adjustable supporting members carried by the wagon-body, supporting-arms mounted upon the wagon-body, brake-bars slidably mounted upon the supporting-arms, connecting means between the supporting-arms and the supporting members, adjusting-bars connecting the supporting-arms with the axle, and means for actuating the brake-bars.

6. In a vehicle-brake, the combination of a wagon-body, a supporting-axle, supporting members carried by the wagon-body, pivoted supporting-arms mounted upon the wagon-body, guide members carried by said arms, brake-bars mounted upon the guide members aforesaid, brake-shoes secured to the brake-bars, connecting means between the guide members of the supporting-arms and the supporting members upon the wagon-body, and other connecting means between the guide members and the axle.

7. In a vehicle-brake, the combination of a wagon-body, a supporting-axle, supporting members carried by the wagon-body, pivoted supporting-arms mounted upon said wagon-body, adjusting-bars connecting said supporting-arms with the axle, brake-bars mounted upon the supporting-arms, brake-shoes carried by said brake-bars, and levers for actuating said brake-bars.

8. In a vehicle-brake, the combination of a wagon-body, a supporting-axle, a supporting-bar secured to the wagon-body, movable supporting-arms carried by the supporting-bar, means for fixing the positions of the supporting-arms, brake-bars slidably mounted upon the supporting-arms, and means for actuating said brake-bars.

9. In a vehicle-brake, the combination of a wagon-body, a supporting-bar carried by the wagon-body, pivoted supporting-arms carried by the supporting-bar, means for adjusting the supporting-arms, brake-bars slidably mounted upon the supporting-arms, brake-shoes carried by the brake-bars, and actuating-levers pivoted to the supporting-arms and connected with the brake-bars.

10. In a vehicle-brake, the combination of a wagon-body, a supporting-bar projected from the wagon-body, supporting-arms pivoted to the supporting-bar aforesaid, guide members carried by the supporting-arms, brake-bars slidably mounted upon said guide members, brake-shoes carried by the brake-bars, adjusting-bars connected with the guide members of the supporting-arms for fixedly positioning same, and actuating-levers pivoted to the supporting-arms and connected with the brake-bars.

11. In a vehicle-brake, the combination of a wagon-body, a supporting-bar projected from the wagon-body, a compensating lever mounted upon the supporting-bar, supporting-arms carried by the supporting-bar and provided with guide members, brake-bars slidably mounted upon the guide members aforesaid, brake-shoes carried by the brake-bars, actuating-levers pivoted to the supporting-arms and connected with the brake-bars, and connecting means between the actuating-levers and the compensating lever.

12. In a vehicle-brake, the combination of a wagon-body, a supporting-axle, a supporting-bar projected from the wagon-body, a compensating lever carried by the supporting-bar, supporting-arms movably mounted upon the supporting-bar, guide members formed with the supporting-arms, brake-bars slidably mounted upon the guide members, brake-shoes carried by the brake-bars, adjusting-bars connecting the axle and the guide members of the supporting-arms, connecting means between the said guide members and the wagon-body, actuating-levers pivoted to the supporting-arms and connected with the brake-bars, connecting means between adjacent ends of the actuating-levers and between these ends and the compensating lever.

13. In a vehicle-brake, the combination of a wagon-body, a supporting-axle, laterally-adjustable supporting members secured to the wagon-body, a supporting-bar projected from the wagon-body, a compensating lever carried by said supporting-bar, extensions projected from the supporting-bar, supporting-arms pivoted to the extensions aforesaid, guide members carried by the supporting-arms, brake-bars slidably mounted upon the guide members, brake-shoes carried by the brake-bars, connecting means between the laterally-adjustable supporting members and end portions of the members of the supporting-arms, adjusting-bars secured to the axle and connected with the guide members aforesaid for positioning the supporting-arms, actuating-levers pivoted to the supporting-arms and connected with the brake-bars, connecting means between adjacent ends of the actuating-levers and the compensating lever, and means for actuating the compensating lever.

14. In a vehicle-brake, the combination of a wagon-body, a supporting-bar projected from the wagon-body, movable supporting-arms carried by the supporting-bar, brake-bars mounted upon the supporting-arms, brake-shoes carried by said brake-bars, means for laterally and longitudinally adjusting the supporting-arms, and means for actuating the brake-bars.

15. In a vehicle-brake, the combination of a wagon-body, a supporting-axle, connecting means between the wagon-body and the supporting-axle, brake-bars mounted upon said means, brake-shoes carried by said brake-bars, and means for actuating said brake-bars.

16. In a vehicle-brake, the combination of a wagon-body, a supporting-bar projected from the wagon-body, supporting-arms carried by the supporting-bar, brake-bars mounted upon the supporting-arms, brake-shoes carried by said brake-bars, the aforesaid supporting-bar being provided with a toothed rack-bar, a compensating lever carried by the supporting-bar and having a toothed segment in mesh with the rack-bar thereof, connecting means between the compensating lever and the brake-bars, a rack-bar mounted upon the wagon-body, an operating-lever provided with a toothed segment in mesh with the rack-bar upon the wagon-body, and connecting means between the operating-lever and the compensating lever.

In testimony whereof I affix my signature in presence of two witnesses.

EMANUEL M. WINTERS. [L. S.]

Witnesses:
I. D. VOSBURG,
C. F. ODELL.